May 8, 1951 C. L. METZ ET AL 2,552,292
RELEASABLE SUBSOILER LATCH MEANS

Filed Aug. 7, 1948 2 Sheets-Sheet 1

INVENTORS
C. L. Metz
N. L. Metz
BY
ATTYS

May 8, 1951  C. L. METZ ET AL  2,552,292
RELEASABLE SUBSOILER LATCH MEANS
Filed Aug. 7, 1948  2 Sheets-Sheet 2
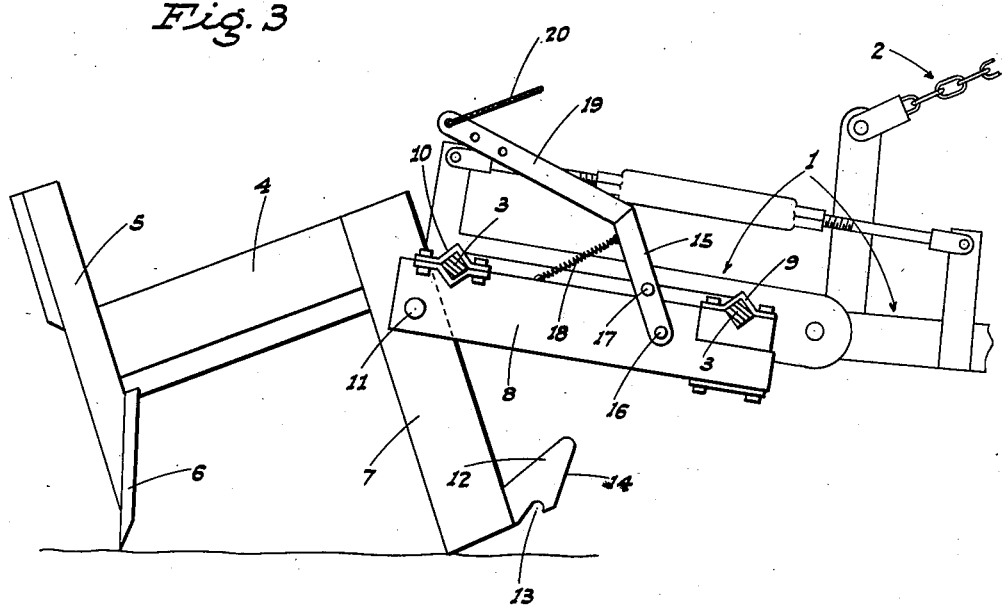
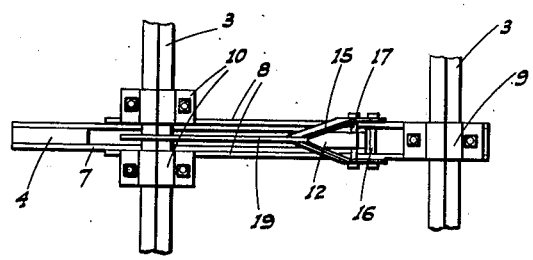
INVENTORS
C. L. Metz
N. L. Metz
BY
ATTYS Patented May 8, 1951

2,552,292

UNITED STATES PATENT OFFICE 2,552,292

RELEASABLE SUBSOILER LATCH MEANS

Claude L. Metz and Noble L. Metz, Tulelake, Calif.

Application August 7, 1948, Serial No. 43,114

3 Claims. (Cl. 97—183)

This invention is directed to, and it is an object to provide, an improved sub-soil plow, or sub-soiler, especially designed, though not limited, for use in connection with a power lift type draft unit of a tractor.

Another object of the invention is to provide a releasable sub-soiler which can be released by the operator from the tractor seat, and thereafter the sub-soiler, reacting to continued forward travel of the tractor, automatically rises out of the ground.

A further object of the invention is to provide a releasable sub-soiler which automatically relatches itself upon raising of the draft unit to a height sufficient for the plow blade and standard assembly to swing forward by gravity from a rearwardly swung, released position resting on the ground.

An additional object of the invention is to provide a releasable sub-soiler which does not place an undue load on the hoist mechanism of the power lift type draft unit on which the sub-soiler is secured.

An additional object of the invention is to provide a practical and reliable sub-soiler, and one which will be exceedingly effective for the purpose for which it is designed.

These objects are accomplished by means of such structure and relative arrangement of parts as will fully appear by a perusal of the following specification and claims.

In the drawings:

Fig. 3 is a similar view, but shows the position of the sub-soiler as released and wholly out of the ground.

Fig. 4 is a plan view of the releasable sub-soiler in latched position.

Figure 1:
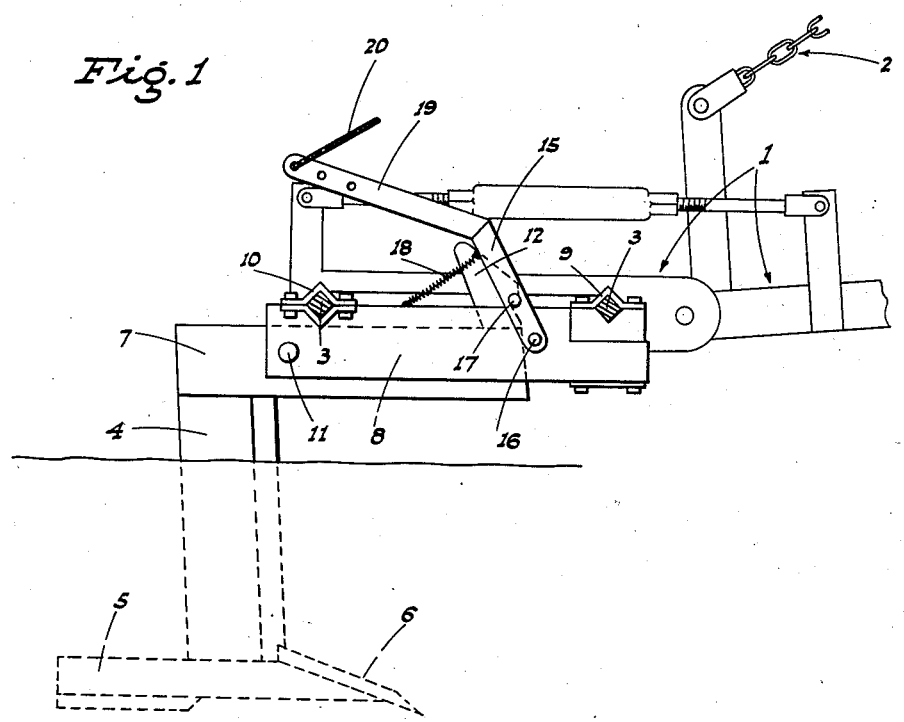
Fig. 1 is a longitudinal sectional elevation of a power lift type draft unit, with the improved releasable sub-soiler mounted in connection therewith; the sub-soiler being shown in working position.

Referring now more particularly to the characters of reference on the drawings, the improved releasable sub-soiler is here shown as mounted in connection with a power lift type draft unit, indicated generally at 1.

The draft unit projects from a tractor (not shown) at the rear thereof, and includes hoist mechanism, indicated in part at 2, whereby said draft unit may be raised or lowered at the will of the tractor operator. A draft unit of this type is shown in co-pending application, Serial No. 13,504, filed March 6, 1948.

Such draft unit 1 includes a pair of transverse tool bars 3 spaced apart in the direction of travel, and it is to these tool bars that the improved releasable sub-soiler is mounted; the latter being constructed as follows:

The sub-soiler comprises a standard 4 feathered or sharpened on the leading edge and fixed, at its lower end, to a longitudinal base 5 intermediate the ends of the latter; the forward end portion of said longitudinal base 5 being fitted with a forwardly and downwardly inclined plow blade 6.

A mounting beam 7 is fixed at its rear end to the upper end of the standard 4 and projects forwardly at substantially a right angle thereto.

The forwardly projecting mounting beam 7 normally extends between a pair of transversely spaced longitudinal attachment plates 8 mounted vertically edgewise in connection with, and extending between, the tool bars 3 by means of a forward clamp 9 and rear clamps 10. Adjacent, but slightly ahead of the standard 4 the mounting beam 7 is transversely pivoted, as at 11, between the rear end portions of the attachment plates 8, whereby said mounting beam 7 is swingable from its normal position between the plates 8 downwardly and rearwardly. The mounting beam 7 is normally latched in position between the attachment plates 8, as follows:

At its forward end the mounting beam 7 includes an upstanding latch plate 12 disposed edge forward and having a forwardly and downwardly opening notch 13 in its front edge. Above the notch 13, the front edge of the latch plate 12 is formed as an upwardly and rearwardly inclined cam 14.

Adjacent the latch plate 12 there is an upstanding fork 15 which straddles the assembly of attachment plates 8, with the legs of said fork pivoted to corresponding ones of said plates, as at 16. Intermediate its ends the fork 15 includes a transverse latch pin 17 which normally but releasably engages in the notch 13 from below, whereby to effectively prevent downward swinging of the mounting beam 7 about its pivot. The fork 15 normally inclines upwardly and rearwardly; the transverse latch pin 17 then riding against the upper edges of the attachment plates 8 to prevent rearward and downward swinging of said fork 15. A spring 18 connected to the fork tends to maintain it beyond dead-center in a rearward direction.

A pull lever 19 is fixed to the upper end of the fork 15 and extends with an upward and rearward inclination; there being a pull cord 20 leading from the pull lever 19 forwardly to a point accessible to the driver of the tractor from his seat thereon.

At certain times when the sub-soiler is in use it is desirable or necessary that the same be released and raised to the top of the ground. To do this solely by the hoist mechanism of the lift type draft unit 1 would impose too great a strain on such mechanism.

Figure 2:
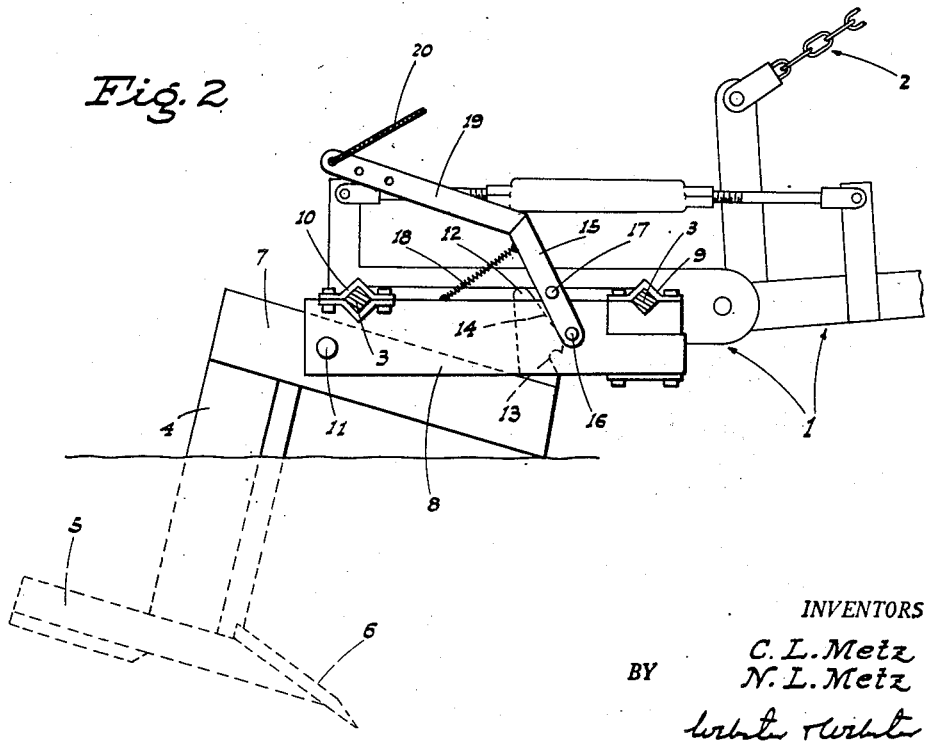
Fig. 2 is a similar view, but shows the position of the sub-soiler a moment after release of the latch and as the sub-soiler begins to rise.

The present invention eliminates the need of relying upon the hoist mechanism to lift the subsoiler, and when the latter is released or unlatched it automatically rises to the top of the ground in response to continued forward travel of the tractor. This result is accomplished as follows:

The operator pulls cord 20, causing lever 19 and fork 15 to swing forward, whereupon the latch pin 17 escapes the notch 13. When this occurs the assembly of the standard 4, longitudinal base 5, and plow blade 6, dragging in the ground with continued travel of the tractor, cause rotational movement about the transverse pivot 11, and so that the mounting beam 7 swings downward into engagement with the ground, as in Fig. 2. Thereafter, as the tractor continues its travel, the rotative motion about transverse pivot 11 also continues until the subsoiler is substantially wholly above ground, with the plow blade 6 bearing on the ground along with the forward end of the mounting beam 7, as clearly shown in Fig. 3. As the forward end of the mounting beam 7 rides the ground, with some tendency to drag or bite in, the rotation of the sub-soiler from lowered-in-the-ground, working position to raised, out-of-the-ground, non-working position, is assured.

It will thus be seen that the releasable subsoiler, when unlatched, is automatic in its action, without requiring any load on the hoist mechanism of the lift type draft unit.

To reset the sub-soiler, the draft unit 1 need only be raised to a point at which the assembly of standard 4, base 5, and plow blade 6 can swing forward gravitationally. When this occurs the mounting beam 7 swings to its normal position between the attachment plates 8, and the cam 14 guides the transverse latch pin downwardly until it snaps into the notch 13.

The sub-soiler when in use is raised at the end of a field to permit of turning of the tractor, or is raised to clear obstructions which may be engaged during operation of the implement. Also, for transport the sub-soiler is not only released and raised, but is lifted by the draft unit to a clearance position above ground.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired.

1. A latch means for a sub-soiler which includes a mobile frame, a standard, and a mounting beam for the standard adapted to be pivoted to the frame, such latch means comprising a pair of spaced-apart plates between which the mounting beam is pivoted, such mounting beam normally projecting forwardly of the pivot point and between the plates, an upstanding latch plate adjacent the forward end of the mounting beam, such latch plate having a generally forwardly and downwardly opening notch in its front edge, such notch normally lying above the top edge of the plates, a lever pivoted on the plates and extending upwardly above the top edge of the plates, a latch pin fixed on the lever at a point above its pivotal connection with the plates, such pin normally lying against the top edge of the plates and in the notch, and means to swing the lever to release the pin from the notch.

2. A latch means as in claim 1 in which the forward edge of the latch plate above the notch is formed as an upwardly and rearwardly inclined cam engageable with the latch pin.

3. A latch means as in claim 2 including a yieldable member acting against the lever to hold the latch pin against the cam during upward movement of the latter.

CLAUDE L. METZ.
NOBLE L. METZ.

REFERENCES CITED

The following references are of record in the file of this patent:

UNITED STATES PATENTS

| Number | Name | Date |
|--------|------|------|
| 313,286 | Casaday | Mar. 3, 1885 |
| 373,784 | Myers | Nov. 22, 1887 |
| 451,256 | Barton | Apr. 28, 1891 |
| 1,078,871 | Olson | Nov. 18, 1913 |
| 1,083,428 | Boals | Jan. 6, 1914 |
| 1,651,031 | Lindgren | Nov. 29, 1927 |
| 1,855,604 | Lindeman | Apr. 26, 1932 |
| 2,401,139 | Cook | May 28, 1946 |